United States Patent [19]

Rasmussen

[11] Patent Number: 5,058,243
[45] Date of Patent: Oct. 22, 1991

[54] STRAP CONNECTOR

[76] Inventor: Donald D. Rasmussen, P.O. Box 250, Tualatin, Oreg. 97062-0250

[21] Appl. No.: 574,601

[22] Filed: Aug. 29, 1990

[51] Int. Cl.5 ............................................ A44B 21/00
[52] U.S. Cl. .............................. 24/68 R; 24/68 CD; 24/71.2
[58] Field of Search ............. 24/68 R, 68 CD, 68 CT, 24/71.2; 294/74

[56] References Cited

U.S. PATENT DOCUMENTS

| | | | |
|---|---|---|---|
| 1,490,618 | 4/1924 | McKinney | 24/71.2 |
| 1,698,813 | 1/1929 | Gouirand | 24/71.2 |
| 3,120,946 | 2/1964 | McCormack et al. | 24/68 CT |
| 3,754,733 | 8/1973 | Foster | 24/68 R |
| 4,315,350 | 2/1982 | Looker et al. | 24/68 CD |
| 4,507,829 | 4/1985 | Looker | 24/68 CT |
| 4,525,007 | 6/1985 | Chapalain | 294/74 |
| 4,799,269 | 1/1989 | Rasmussen | 24/68 |
| 4,823,443 | 4/1989 | Waters | 24/68 CD |

Primary Examiner—Victor N. Sakran
Attorney, Agent, or Firm—Eugene M. Eckelman

[57] ABSTRACT

A U-shaped body portion has an attaching end for a cable or hitch connection and an opposite open end for receiving a strap to be connected to the body portion. In a first embodiment the body portion includes a pair of anchor bars arranged to receive a doubled back and looped end of a strap arranged to pinch the strap when a pulling tension is applied to the strap. A removable pin is mounted in the body portion and disposed between the anchor bars and the attaching end for insertion in the loop of the looped end of the strap. In another embodiment, one of the anchor bars is a removable pin in a structure that functions efficiently as a connector for both Nylon and metal straps. In addition to serving as a lifting connection for straps, the connector hereof can serve as a connector for a towing strap.

2 Claims, 3 Drawing Sheets

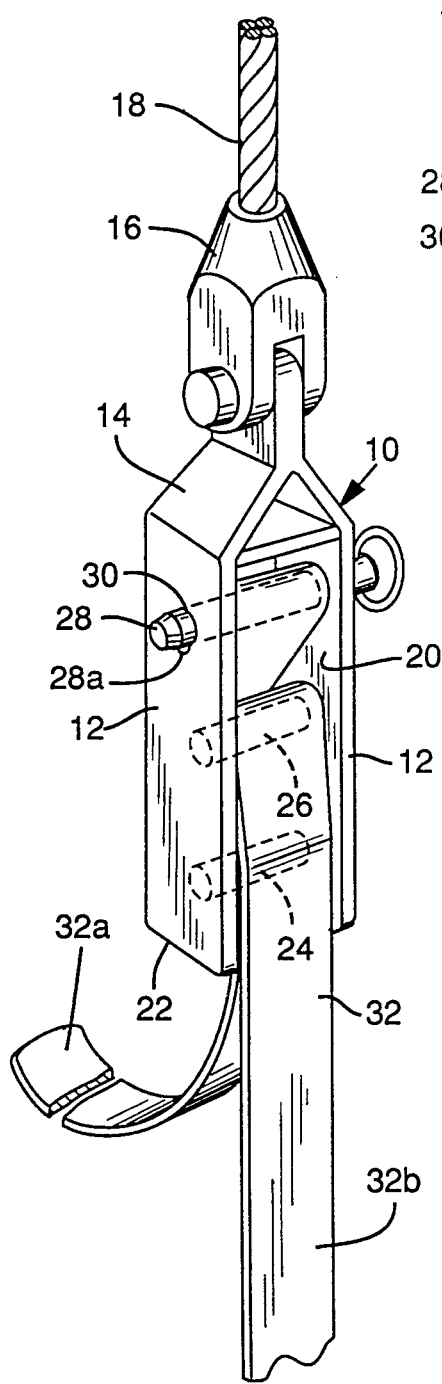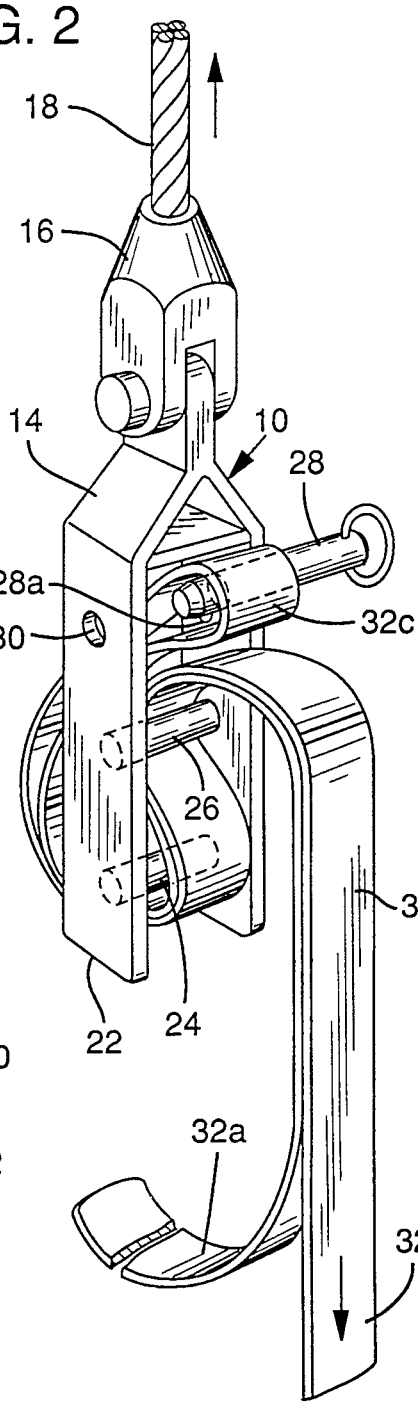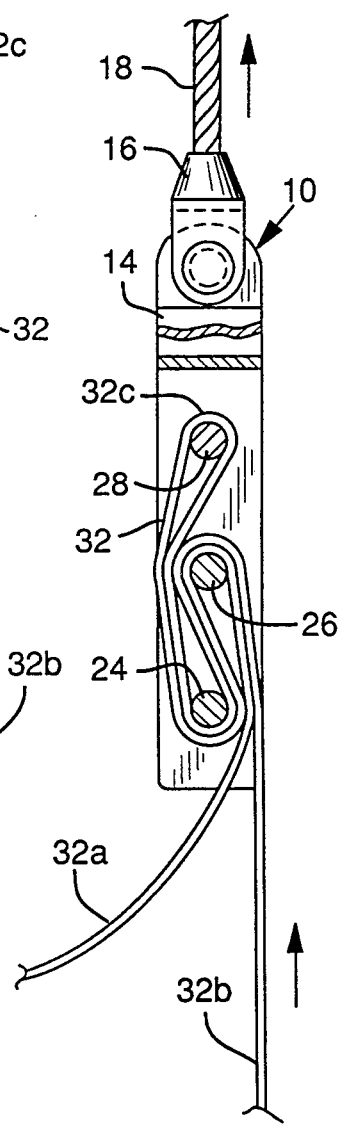

STRAP CONNECTOR

REFERENCE TO PRIOR APPLICATION

This application is a continuation-in-part of application Ser. No. 07/524,567, filed May 17, 1990.

BACKGROUND OF THE INVENTION

This invention relates to new and useful improvements in strap connectors.

In my U.S. Pat. No. 4,799,296 a strap connector is illustrated which comprises a body portion having a hollow interior and including stationary anchor means in the body portion arranged to receive a strap capable of releasable securement thereto. The anchor means in this patented structure is arranged to provide attachment for the strap wherein the free end portion of the strap is pinched under a load connected end portion therof by a tension force of the load. A releasable pin is provided in the body portion and is arranged for insertion in the loop of a doubled back portion of the strap for positioning the loop in its pinched, secured position on the body portion and for release from the body portion when it is desired to disconnect the strap from the connector. This prior structure includes a ratchet assembly arranged to take up an excess of the free end of the strap.

Such a connector structure has important advantages, one advantage being that the free end of the strap can be unobstructed and thus can be readily pulled free of the component that was moved with the strap. Another advantage is that specific strap lengths do not have to be supplied since one length of strap may be utilized and specific lengths thereof accommodated by releasable securement at any point on the strap.

SUMMARY OF THE INVENTION

According to the present invention and forming a primary objective thereof, a strap connector is provided that has structural and functional advantages over prior strap connectors.

Specific objects of the invention are to provide a strap connector of the type described that provides load securement for either of two strap portions that lead from a doubled back looped end associated with releasable pin means in the connector, thus making the connector more versatile and simpler to use than prior structures. Another object is to provide a connector wherein the overall structure thereof is simplified and inexpensive to manufacture. Yet another object is to provide an embodiment of connector that has efficient use with metal strap.

In carrying out the objectives of the invention, the body portion of the connector has opposite ends with one of the ends comprising an attaching end for powered strap lifting means and the other end being open for receiving a strap to be attached to the connector. The connector has stationary anchor means mounted in the body portion which are arranged to receive a doubled back, looped end of a strap comprising a strap excess end portion and a load connected end portion. The anchor means are arranged to pinch the strap excess end portion and the load connected end portion thereagainst as a result of a pulling tension on the load connected end portion. Removable pin means are provided in the body portion which are disposed in the strap receiving area between the anchor means and the lifting end of the body portion for insertion in looped portions of the strap. Each end of the looped strap extends freely through the open end of the body portion and thus either of such ends may be employed as the load connected end portion.

The invention will be better understood and additional objects and advantages will become apparent from the following description taken in connection with the accompanying drawings.

BRIEF DESCRIPTION OF THE DRAWINGS

FIG. 1 is a perspective view of a strap connector of the invention showing a strap secured thereto.

FIG. 2 is a perspective view similar to FIG. 1 but showing the connector in a process of being loaded.

FIG. 3 is a side elevational view of the connector, a side wall thereof being broken away to illustrate the strap securement thereto in detail.

DETAILED DESCRIPTION OF PREFERRED EMBODIMENTS

Figure 4:
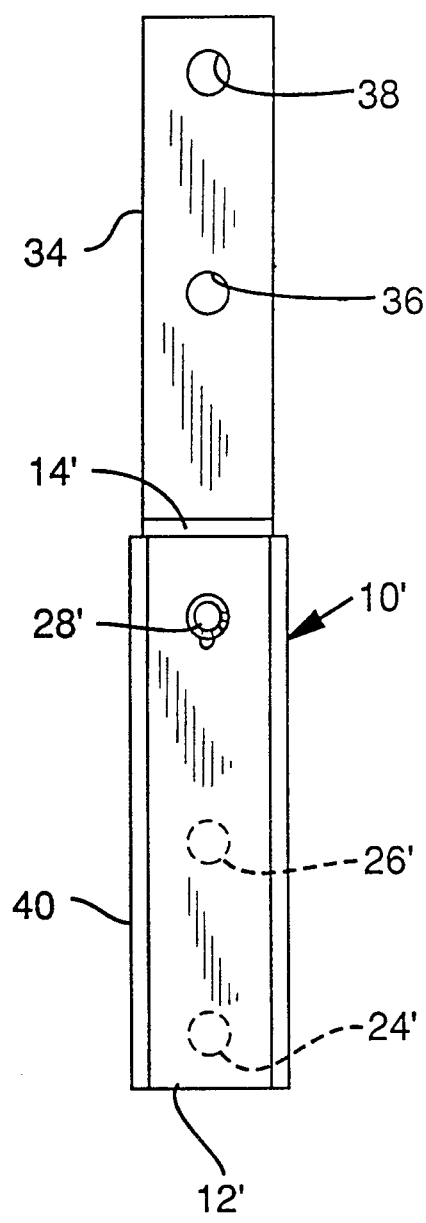
FIG. 4 is a side elevational view of a second embodiment of the invention wherein the connector can be used in combination with a box trailer hitch.

With particular reference first to FIGS. 1-3, a first embodiment of the present connector comprises a U-shaped body portion 10 with parallel side walls 12 and a reinforced lifting end portion 14 arranged for attachment to a shackle 16 of a cable 18. The other two sides of the body portion are open to provide access from either side to a strap receiving area 20 between the wall 12. The bottom 22 of the body portion is also open.

A pair of heavy duty anchor bars or members 24 and 26 extend integrally between the walls 12 with the first bar 24 located adjacent the open end 22 of the body portion and the bar 26 spaced therefrom in a direction toward the closed end of the body portion. Located between the closed end of the body portion and anchor bar 26 is a pin 28 removably mounted in opposite apertures 30. Pin 28 includes spring pressed catch means 28a which provides a positive but releasable securement of the pin in the body portion.

Numeral 32 represents a strap of the type to which the present connector is intended to be used. For purposes of explanation, the numeral 32a designates a free or excess end of the strap and the numeral 32b designates a load connected end portion. In the use of the connector the slack in the strap between the body portion of the connector and the load is taken out and the pin 28 removed. The free end 32a is doubled back on the load connected end portion 32b to form an end loop 32c. This doubled back portion is made of a sufficient length such that it can be reeved around the anchor bars 24 and 26 and hooked on the pin 28 in the manner shown specifically in FIG. 3.

More particularly, a sufficient length of doubled back strap at the free end is first brought in at one open side of the body portion, for example, the right side in FIG. 3, and reeved over the anchor bar 26. From there, this doubled portion is reeved down and up around anchor bar 24 in a manner such that it extends up along the opposite open side of the body portion. To complete the loading of the strap in the body portion, the looped end 32c of the strap is brought up in alignment with the apertures 30 and the pin 28 installed through the apertures 30 and through the loop 32c. The unused or free end 32a of the strap merely hangs free. Since the connector can be combined with the strap at any point on the strap, one length of strap can serve many length requirements for different loads. The strap or straps can have length indicia thereon for selected engagement with the strap connector whereby to readily determine points of connection for single straps or for coordination between lifts utilizing more than one strap.

With both of the ends 32a and 32b extending freely through the bottom end of the body portion 14, it is apparent that the doubled back strap can be loaded from either of the open sides of the body portion and reversed from that shown in FIG. 3 if desired. Also, either of the ends 32a or 32b can be the load connected end portion and the other of these ends can be the free end portion. Where the strap end 32b comprises a load connected end portion, as shown in FIG. 3, the pinched engagement of the free end portion is on the upper side of anchor bar 26, whereas if the end 32a is the load connected end portion pinches engagement will occur on the underside of the anchor bar 24. Thus the device is readily loaded and cannot accidentally be misloaded.

For disconnecting the strap from the device, it is merely necessary to provide slack in the load connected end portion and remove the pin 28.

Figure 5:
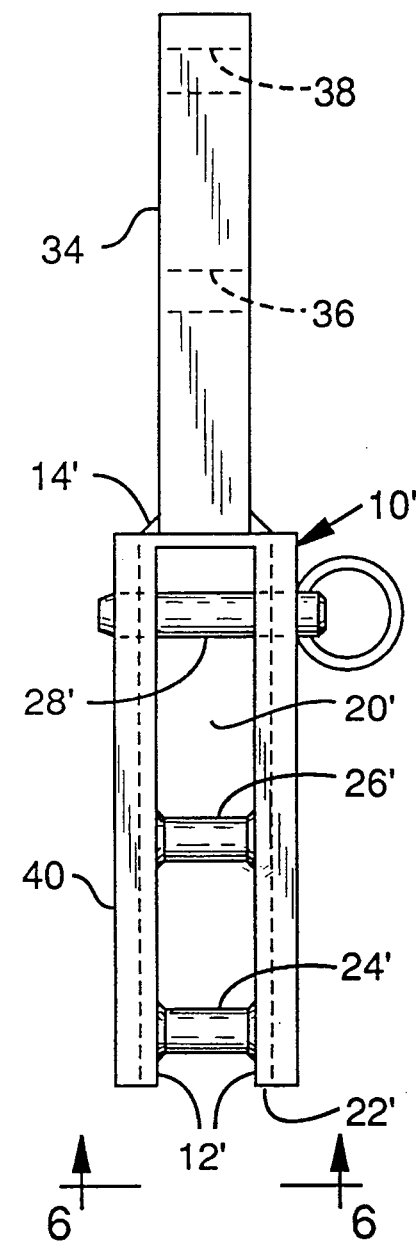
FIG. 5 is a side elevational view of the second embodiment taken from the right side of FIG. 4.
Figure 6:
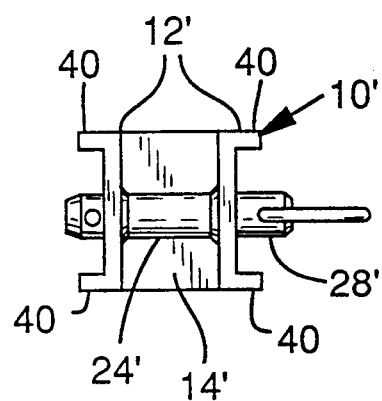
FIG. 6 is a front elevational view taken on the line 6—6 of FIG. 5.

The embodiment of FIGS. 4, 5 and 6 illustrates use of the invention as a tow bar. In such embodiment, the body portion 10' has opposite side walls 12' similar to the embodiment of FIG. 1 and also employs similar integral anchor bars 24' and 26' as well as removable pin 28'. Connection of the strap with this portion of the body portion is identical to that of the FIG. 1 embodiment. The closed end 14' of the second embodiment is associated with an integral extension 34 arranged for releasable securement in a conventional box-type hitch portion, not shown. Extension 34 has an aperture 36 that receives the usual hitch pin in the box type hitches. Extension 34 is also provided with an aperture 38 adjacent the end thereof capable of connection to a shackle instead of a trailer hitch box. The embodiment of FIGS. 4–6 thus can be used as a connector in combination with a box type hitch wherein the pulling connection comprises a strap, or, by using aperture 38, it can be used as a lifting connector as in FIGS. 1–3. As best seen in FIG. 6, the body portion 10 has angle extensions 40 for reinforcing this portion of the connector in its use as a hitching device.

Figure 7:
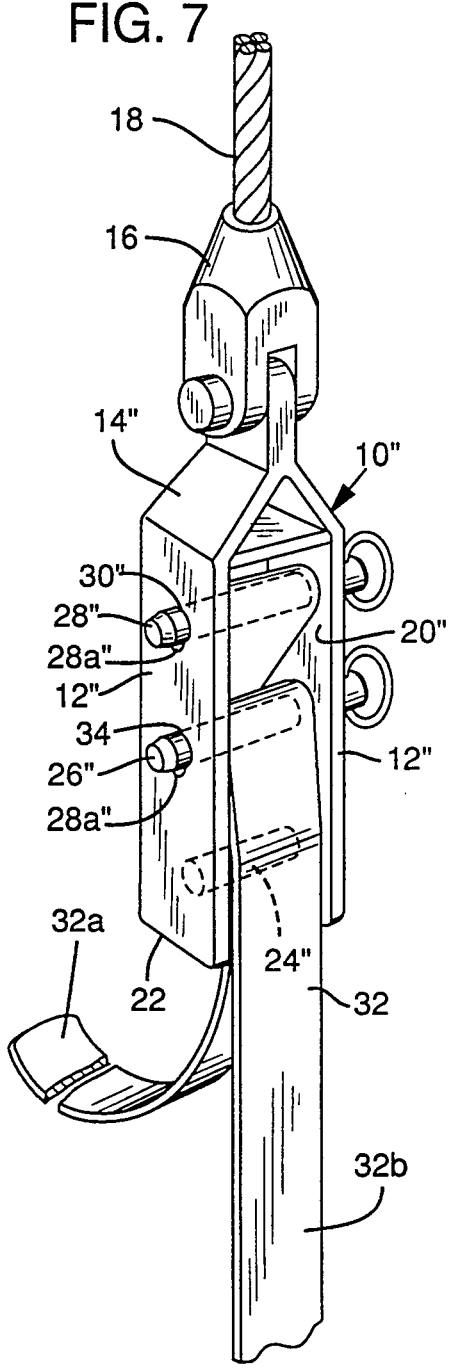
FIG. 7 is a perspective view of a further embodiment of the invention.
Figure 8:
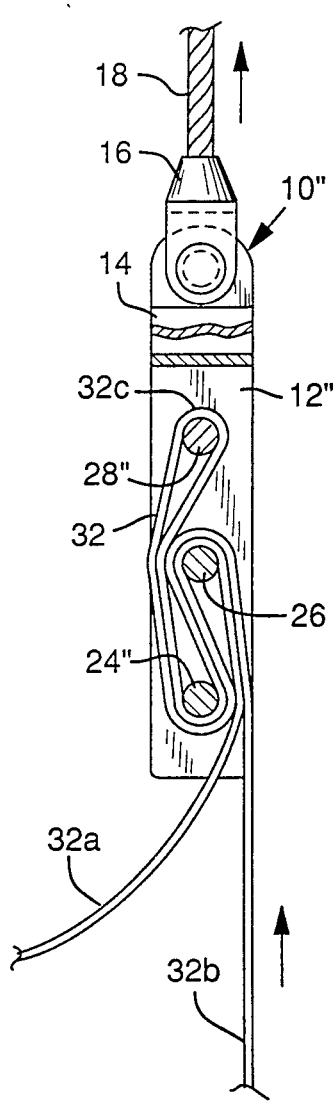
FIG. 8 is a side elevational view thereof, a side wall of the connector being broken away to illustrate the strap securement thereto in detail.
Figure 9:
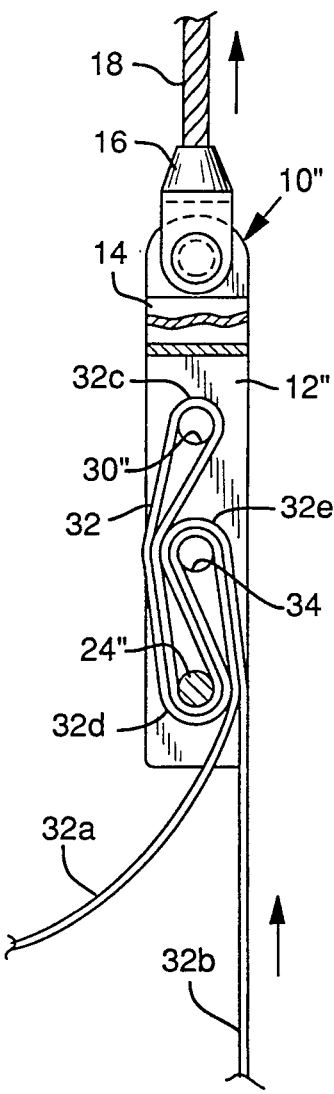
FIG. 9 is a view similar to FIG. 8 but showing the connector as it appears in a process of loading or unloading.

FIGS. 7, 8 and 9 show an embodiment of the invention that will function efficiently with Nylon strap but especially with metal strap or other type of strap that can bend and straighten out but not repeatedly without fatigue. This connector is similar to FIG. 1 in that it comprises a U-shaped body portion 10", parallel side walls 12", a reinforced lifting end portion 14" for attachment to a shackle 16 and lifting cable 18, a strap receiving area 20", an open bottom 22", an anchor bar 24" adjacent the open end of the body portion and a removable pin or anchor bar 28" mounted in opposite apertures 30" adjacent the lifting end of the body portion. Pin 28" likewise has catch means 28a" providing a positive but releasable securement of the pin in the body portion.

In this embodiment, however, the member 26" comprises a removable pin or anchor bar mounted in opposite apertures 34. It has catch means 28a" that provide a positive but releasable securement thereof in the body portion.

When used with a Nylon strap, the embodiment of FIGS. 7, 8 and 9 is used the same as that described in connection with the FIG. 1 embodiment. That is, the pin 26" remains in place during loading and unloading of the strap and the pin 28" is inserted and removed during the process. When used with a metal strap, both pins 26" and 28" are inserted and removed during the loading and unloading process, as follows:

Pins 26" and 28" are first taken out for loading, as seen in FIG. 9. The strap is then bent by hand to form the loop 32c. This bend is made at a selected lifting length of the strap. After forming the bend 32c, the pin 28" is installed. Thereupon, the doubled length of strap from the pin 28" is looped under bar 24" in a bend 32d and up toward apertures 34. This double strap portion is then bent at 32e so as to curve over the apertures 34. The pin 26" is then installed. This loaded condition of the strap is shown in FIGS. 7 and 8 and operates identical to the FIG. 1 embodiment as to forming a positive, pinched friction connection without the necessity of fasteners. Although the metal strap is illustrated as being formed within the connector for loading, it is to be understood that skilled workmen can pre-bend the strap with bends 32c, 32d and 32e wherein in such preformed shape it will slide freely up from the bottom of the connector with the pins 26" and 28" removed. In such upward movement, the looped end or bend 32c moves up one side of bar 24" and the looped portion or bend 32e moves up the other side with the looped portion or bend 32d hooking on bar 24". The pins 26" and 28" are then installed.

When the metal strap is to be disconnected from this second embodiment, it is merely necessary to remove pins 26" and 28" since then the portions 32c and 32e will drop freely out opposite sides of bar 24". Metal strapping may or may not be re-used but since it is subject to fatigue upon repeated bending and since it is comparatively inexpensive, previous connector points thereon will not be used.

It is to be understood that the forms of my invention herein shown and described are to be taken as preferred examples of the same and that various other changes in the shape, size and arrangement of parts may be resorted to without departing from the spirit of my invention, or the scope of the subjoined claims.

Having thus described my invention, I claim:

1. A strap connector for use with a strap having a pair of free ends, said connector comprising:
   a body portion having a strap receiving area therein with opposite defining side walls and also having opposite ends,
   one of said ends comprising an attaching end for powered tension means and the other of said ends being open into the strap receiving area,
   first, second and third anchor bars extending across said strap receiving area and being mounted in said side walls, said anchor bars receiving looped portions of the strap with the free ends of the strap comprising a strap excess end portion and a load connected end portion, said anchor bars being positioned such that one of then pinches the strap excess end portion between said one bar and the load connected end portion by a pulling tension on the load connected end portion and with the strap excess portion extending freely from said anchor bars and from said body portion to allow either of said free ends of the strap to be the strap excess portion or the load connected end portion, at least two of said anchor bars being removably mounted in said side walls for insertion thereof laterally in looped portions of the strap for holding the latter in a secured position on said body portion with the free end of the strap pinched between said one anchor bar and the load connected end portion of the strap and for removal from the strap receiving area to release the strap from said body portion.

2. The strap connector of claim 1 wherein said anchor bars are spaced apart in said strap receiving area between opposite ends of said body portion, said two removable anchor bars being disposed toward the attaching end of said body portion relative to said third anchor bar whereby preformed looped portions of the strap are arranged to be inserted into and removed from the open end of said body portion.

* * * * *